UNITED STATES PATENT OFFICE.

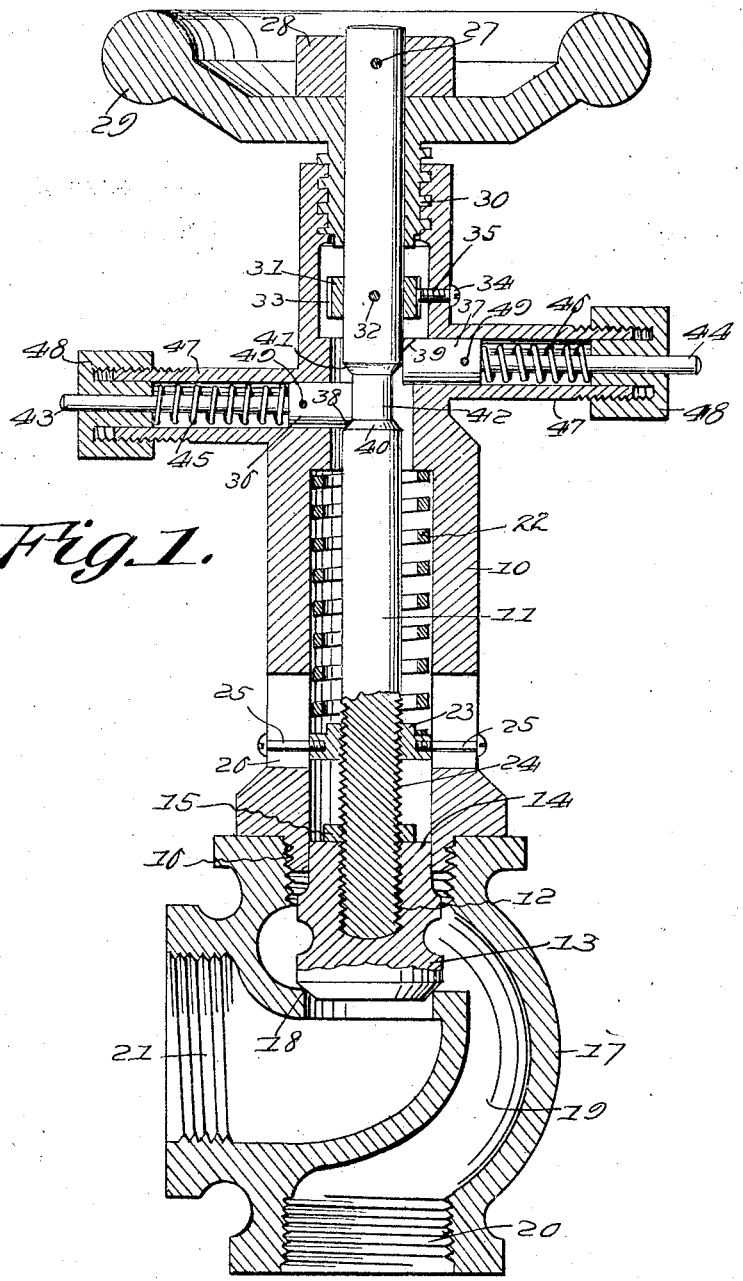

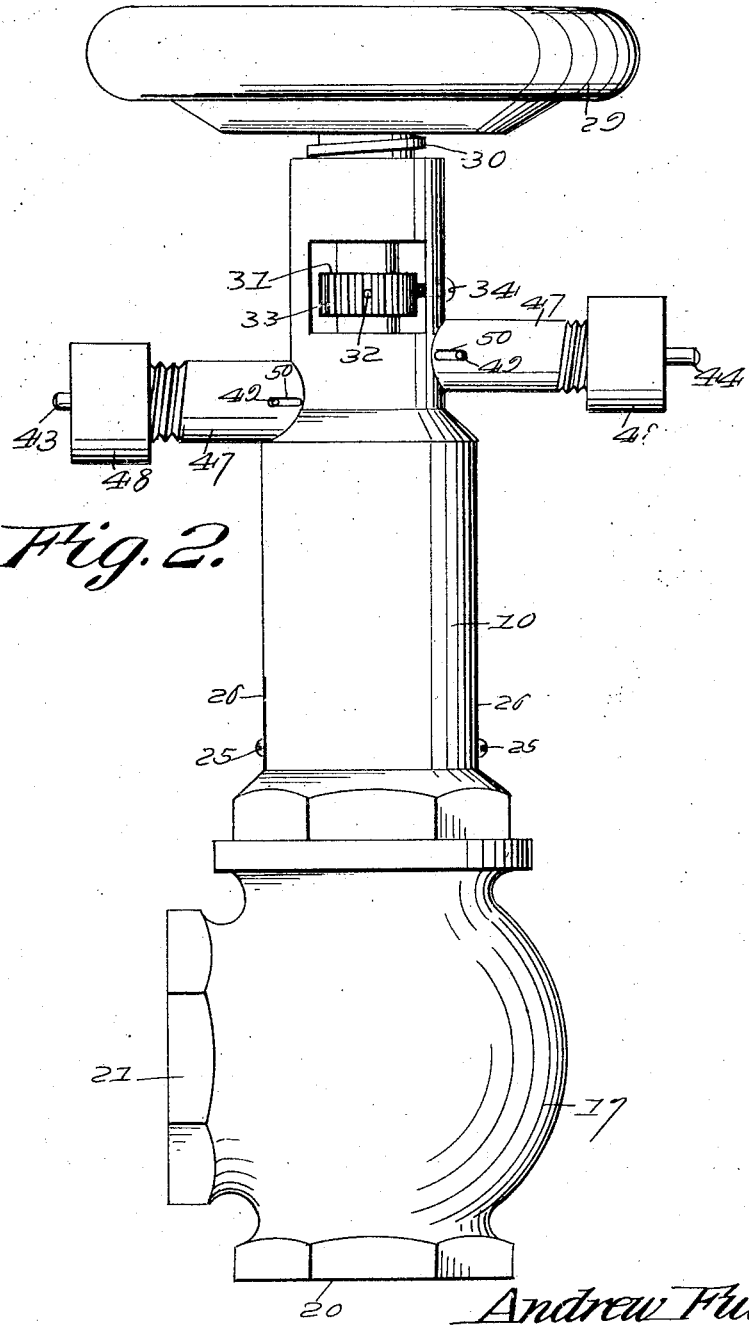

ANDREW FULLER, OF LINNTON, OREGON.

INJECTOR-CONTROLLING VALVE.

1,365,476.     Specification of Letters Patent.     Patented Jan. 11, 1921.

Application filed July 14, 1919. Serial No. 310,590.

*To all whom it may concern:*

Be it known that ANDREW FULLER, a citizen of the United States, residing at Linnton, in the county of Multnomah and State of Oregon, has invented new and useful Improvements in Injector-Controlling Valves, of which the following is a specification.

The object of the invention is to provide a relatively simple and efficient means whereby the supply of steam to an injector may be regulated so a to permit of the operation of the injector when needed and to maintain the valve in closed position when the operation of the injector is not necessary, and in that connection to provide the valve with means whereby the pressures necessary to cause the supply and cut-off of the injector operating steam may be adjusted to suit conditions under which the injector is to be used, so as to dispense, except in the matter of an adjustment, with the services of an attendant in connection with the operation of the injector.

Further objects and advantages of the invention will appear hereinafter, it being understood that changes in form and proportion may be resorted to within the scope of the appended claims without departing from the principles involved.

In the drawings:

Figure 1 is a sectional view of the regulating valve.

Fig. 2 is a side view of the same.

Disposed axially within a suitable casing 10 is a valve stem 11 to the lower end of which, by means of a threaded connection 12, is attached a valve 13 of which the upper portion constitutes a plunger 14 operating in the bore of the lower end of the casing. A locking or jam nut 15 is preferably employed in engagement with the threads of the stem to lock the valve in place, so as to guard against the loosening thereof by reason of the turning of the stem, and the lower end of the casing is in threaded engagement as shown at 16 with the globe 17 having the valve seat 18 and the passage 19, controlled by the valve and leading to the outlet 20 for conveying steam, when the valve is unseated, to the injector, not shown. The steam inlet 21 is supposed to be in communication with the supply such as the dome of the boiler, and the valve is adapted to be unseated by pressure in said inlet to permit of passage of the steam, when required for the operation of the injector.

The seating of the valve is effected by means of a spring 22 seated at its lower end upon a collar 23 having an adjustable engagement with the stem as by means of the threaded portion 24 thereof, said collar being held against turning movement with the stem, while permitting axial movement thereof in the unseating and seating of the valve, by reason of retaining pins or screws 25 operating in slots 26 in the wall of the casing, and constituting guides.

Secured to the upper end of the stem, above the casing, as by means of a pin 27 is a nut 28 forming a wrench seat by which the stem may be rotated relative to the collar 23 forming the seat for the lower end of the valve seating spring, to vary the position of said collar with reference to the length of the stem, and thus modify the tension of the valve seating spring to regulate the pressure at which the steam in the inlet of the globe will effect the opening and closing of the valve.

A hand wheel 29 is also swiveled upon the upper end of the valve stem below said wrench seat and is threaded as at 30 in the upper end of the casing so as to serve as a means of imparting axial movement to the valve stem to unseat the valve in opposition to the tension of the spring 22 when it is desired to operate the injector, before steam has been raised in the boiler.

To secure the stem of the valve in a seated or adjusted position revolubly after the desired adjustment of the tension of the valve seating spring has been secured, and in order to prevent the accidental modification of such tension, there is employed retaining means consisting of a head 31 secured to the stem as by a pin 32 and having peripheral grooves 33 disposed parallel with the axes of the stem to form seats for the extremity of a set screw 34 which is threaded in the wall of the casing as shown at 35. In order to adjust the tension of the valve seating spring it is neccessary to loosen this set screw sufficiently to withdraw the extremity with engagement with the head, and obviously after the desired adjustment has been effected the readjustment of the set screw will lock the head and therefore the stem in the desired position while permitting axial or longitudinal movement of the same due to the operation of the valve in seating and unseating under the pressure of steam or by means of the hand wheel 29.

In order that the valve may be held seated until a predetermined pressure of steam of the globe and hence in the boiler has been reached, and then to hold the valve unseated until a sufficient operation of the injector has been permitted to properly supply the boiler with water and reduce the steam pressure, there is employed locking mechanism consisting of latches 36 and 37 provided with beveled shoulders 38 and 39 for engagement respectively and alternately with beveled shoulders 40 and 41 formed on the valve stem by an intermediate reduction thereof as shown at 42. These latches are provided with stems 43 and 44 fitted with actuating springs 45 and 46 arranged in tubular extensions 47 extending laterally from and in communication with the interior of the casing and fitted with tension nuts 48 which serve to regulate the stress of the latch operating springs 45 and 46 and thus the resistance offered to the opening or closing movement of the valve.

Thus the unseating of the valve to permit of the operation of the injector will depend upon the pressure of steam in the inlet passage of the globe regulated by the seating tension of the spring 22 and the resistance offered by the latch 36, it being necessary for said steam pressure to overcome both of these resistances in order to move the valve. When so moved the valve will open under the guidance afforded by the operation of its piston portion 14 in the bore of the casing until the shoulder 41 of the stem is in engaging relation with the latch 37, and the valve will thus be held unseated to permit of the free passage of the steam to the globe through the injector until the steam pressure in the globe falls below a certain predetermined stress regulated by the resistant tension of the latch operating spring 46 and the seating tension of the spring 22, whereupon the valve stem will depress the latch 37, and under the influence of the spring 22 will advance to reseat the valve and thus cut off the steam to the injector.

The operation therefore both in unseating and in seating the valve is positive and regulatable within definite limits, and the valve is locked and held by frictional resistance in each of its adjusted positions so that its movements are definite and the feeding of the steam to the injector is periodic and while depending solely upon the pressure in the boiler does not occur except when such pressure rises or falls to certain predetermined limits, and vibration or chattering of the valve on its seat, permitting partial reductions of steam pressure in the boiler and causing inefficient operations of the injector is prevented, the valve being either positively and fully opened or definitely and effectively seated. The maintenance of the latch heads 36 and 37 in proper positions in their guide tubes, to maintain the beveled shoulders 38 and 39 thereof in proper operative relation with the shoulders on the stem, is maintained by means of guide pins 49 which terminally operate in guide slots 50 in the walls of said guides, as shown clearly in Fig. 2 of the drawings.

The invention having been described, what is claimed as new and useful is:

1. An injector feed valve seatable in opposition to boiler pressure and having a seating spring and a stem surrounded thereby, a collar threaded upon the stem for receiving the pressure of said spring and means for securing the collar against the rotary movement while permitting axial movement thereof with the stem, the latter being revoluble to vary the adjustment of the collar and the tension of said spring.

2. An injector feed valve seatable in opposition to boiler pressure and having a seating spring and a stem surrounded thereby, a valve casing, a collar threaded upon said stem to receive the seating pressure of said spring and provided with guide pins operating in slots in the casing, and means for turning the stem to vary the adjustment of said collar thereon.

3. An injector feed valve seatable in opposition to boiler pressure and having a stem, a casing inclosing the same, a valve seating spring, a collar threaded upon the stem for receiving the pressure of said spring and provided with guide pins operating in slots in the casing, said stem being provided with a wrench seat located beyond the end of the casing, and a hand wheel swiveled upon the stem and threaded in the casing in operative relation with said wrench seat for imparting axial movement to the same.

4. An injector feed valve seatable in opposition to steam pressure and having a stem, a casing inclosing the stem, a valve seating spring, a collar threaded upon the stem for receiving the pressure of said spring and guided in the casing to prevent rotary movement thereof with the stem, the latter being revoluble to vary the adjustment of the collar on the stem, and retaining means for securing the stem against turning movement while permitting axial movement thereof.

5. An injector feed valve seatable in opposition to boiler pressure and having a stem, a casing inclosing the stem, a valve seating spring, a collar threaded upon the stem for receiving the pressure of the seating spring and guided in the casing to prevent turning movement with the stem, means for turning the stem to adjust the collar thereon, and retaining means for the stem consisting of a head carried thereby and provided with peripheral seats parallel with and extending in the direction of the length of the stem, and a set screw carried by the casing in terminal engaging relation with one of said peripheral seats.

In testimony whereof he affixes his signature.

ANDREW FULLER.